United States Patent [19]

Hatanaka et al.

[11] 4,144,848
[45] Mar. 20, 1979

[54] ORIENTATION OF TORCH OPENINGS FOR PRECHAMBER ENGINE

[75] Inventors: Toru Hatanaka, Urawa; Yoshitoku Iizuka, Toda, both of Japan

[73] Assignee: Honda Giken Kogyo Kabushiki Kaisha, Tokyo, Japan

[21] Appl. No.: 780,318

[22] Filed: Mar. 23, 1977

[30] Foreign Application Priority Data

Apr. 1, 1976 [JP] Japan ................................. 51/35182

[51] Int. Cl.² .......................................... F02B 23/06
[52] U.S. Cl. .............................. 123/32 L; 123/32 K; 123/191 SP
[58] Field of Search .............. 123/32 L, 32 K, 32 SP, 123/191 SP, 75 B

[56] References Cited

U.S. PATENT DOCUMENTS

3,890,942  6/1975  Date et al. ................... 123/191 SP

FOREIGN PATENT DOCUMENTS

| 536634 | 10/1931 | Fed. Rep. of Germany | 123/32 K |
| 24807 | 11/1956 | Fed. Rep. of Germany | 123/32 K |
| 2142951 | 3/1973 | Fed. Rep. of Germany | 123/32 L |
| 1202585 | 1/1960 | France | 123/32 L |
| 522673 | 4/1955 | Italy | 123/32 L |
| 167481 | 6/1959 | Sweden | 123/32 K |
| 708886 | 5/1954 | United Kingdom | 123/32 K |

*Primary Examiner*—Charles J. Myhre
*Assistant Examiner*—David D. Reynolds
*Attorney, Agent, or Firm*—Lyon & Lyon

[57] ABSTRACT

An internal combustion piston engine has a prechamber or auxiliary chamber associated with each main combustion chamber and connected thereto by a plurality of torch openings. Ignition of a relatively rich mixture in the auxiliary chamber causes flames to be projected through the torch openings to ignite the relatively lean mixture in the main combustion chamber. At least three torch openings are provided in the bottom wall of the auxiliary chamber; one is directed toward the main intake valve in the main combustion chamber, another is directed toward the exhaust valve in the main combustion chamber, and a third directs a flame toward a region of the main combustion chamber remote from both valves. Additional torch openings are employed for larger engines. The relative positions of the torch openings are defined as well as their total cross sectional area compared to the volume of the auxiliary combustion chamber.

8 Claims, 4 Drawing Figures

ORIENTATION OF TORCH OPENINGS FOR PRECHAMBER ENGINE

This invention relates to internal combustion spark ignition piston engines of the type employing a prechamber or auxiliary chamber adjacent each main combustion chamber, the chambers being connected by a torch opening. Relatively rich mixture is ignited in the auxiliary chamber at the end of the compression stroke, and this causes a flame to be projected into the main combustion chamber to ignite a relatively lean mixture. An engine of this general type is disclosed in the Date et al U.S. Pat. No. 3,830,205 granted Aug. 20, 1974.

Internal combustion engines of this type operate advantageously for reduction of the $NO_x$ content in the exhaust gases, and for greater reduction of $NO_x$ the lean mixture supplied to the main combustion chamber is so lean as to be within a range of unassured or impossible spark ignition. Prior to this invention, a single torch opening has been provided near one side of the main combustion chamber for projection of a flame across the chamber to the other side. This system has a disadvantage when the mixture is extremely lean because the rate of flame propagation is low. At the end of the compression stroke of the piston, particularly under operating conditions close to full open throttle where the effective compression ratio is great, the lean mixture located in a region far away from the torch opening is affected by the pressure rise caused by the ignition of the mixture in the neighborhood of the torch opening so as to be adiabatically compressed to a high temperature. It self-ignites to burn abnormally to develop knocking, before the torch flame reaches the region in question. This self-ignition is likely to occur at the end of the compression stroke in the neighborhood of the exhaust valve which is generally the hottest spot in the main combustion chamber.

In order to prevent the abnormal burning and possible knocking it is necessary for the torch flame to reach the region before self-ignition occurs. While this result may be accomplished by simply placing the single torch passage so that the direction of the flame is toward the exhaust valve, such an arrangement retards the ignition of the lean mixture in the direction of the main intake valve, with the result that the overall combustion in the main combustion chamber is poor. Furthermore, because the rate of flame propagation is very slow in the lean mixture, the single torch opening has been located as close to the exhaust valve as possible and near the center of the main combustion chamber. However, this retards the propagation of flame to portions of the lean mixture located remote from the exhaust valve, also bringing about poor combustion overall.

It is therefore an important object of this invention to provide a torch flame ignition system for a very lean mixture which minimizes self-ignition and knocking even when the engine is under full load. This object is achieved by providing a plurality of torch openings between the auxiliary combustion chamber and the main combustion chamber, and positioning them so that they direct torch flames toward both of the valves in the main combustion chamber as well as directing another torch flame toward a region of the main combustion chamber remote from said valves.

Other objects and advantages will appear hereinafter.

Figure 1:
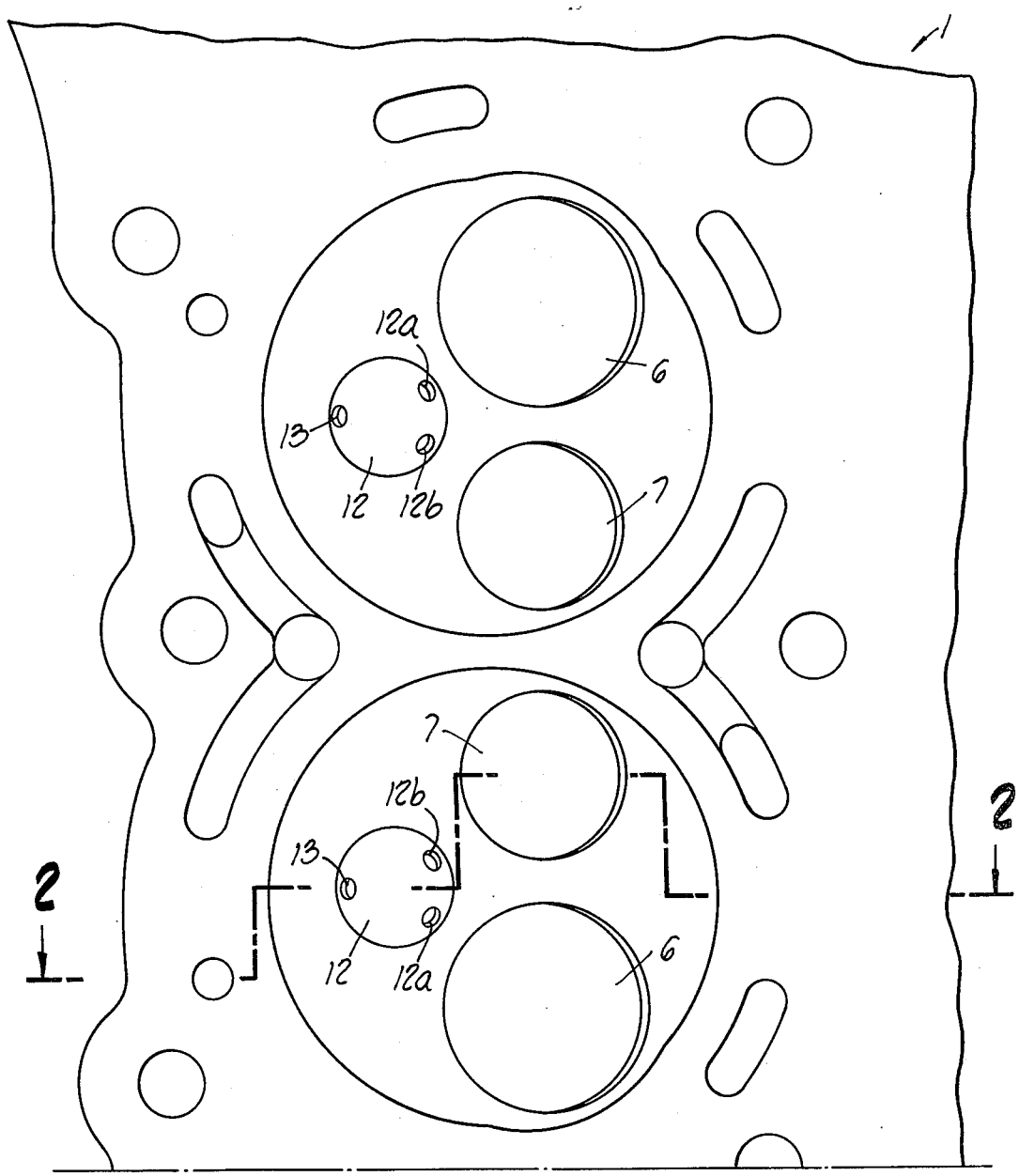
FIG. 1 is a bottom view of a cylinder head of an internal combustion engine, and constituting a preferred embodiment of this invention.

Referring to the drawings, the internal combustion spark ignition piston engine generally designated 1 is intended for use in automobiles and the like. The engine 1 employs a plurality of pistons 2 reciprocating within cylinders 3 formed within a cylinder block 4. The cylinder head 5 cooperates with the cylinder block 4 and each piston 2 to form a main combustion chamber 8 provided with a main intake valve 6 and an exhaust valve 7. A relatively lean air-fuel mixture is supplied to each main combustion chamber 8 through each main intake valve 6, and a relatively rich air-fuel mixture is supplied through an auxiliary intake valve 9 to an auxiliary combustion chamber 11. A spark plug 10 ignites the mixture in the auxiliary combustion chamber 11 at the end of the compression stroke of the piston 2, and this projects flames through the torch openings 12a, 12b and 13 to ignite the lean mixture in the main combustion chamber 8.

The main combustion chamber 8 is wedge shape or semi-spherical shape with its deepest portion located in the neighborhood of the axis X—X of the cylinder 3. The auxiliary combustion chamber 11 is formed within a hollow cylindrical body 12 made of heat resisting metal of relatively thin wall thickness. The bottom wall of the body 12 is semi-spherical and projects into the main combustion chamber 8 at one side of the axis X—X.

A first torch opening 12a and a second torch opening 12b are formed in the bottom wall of the cylindrical body 12, the first torch opening 12a being positioned to direct a flame toward the main intake valve 6 and the second torch opening 12b being positioned to direct a flame toward the exhaust valve 7. The third torch opening 13 is also positioned in the bottom wall of the cylindrical body 12 remote from the torch openings 12a and 12b. The flames projected from the torch openings 12a and 12b reach portions of the main combustion chamber 8 before self-ignition occurs by high temperatures caused by adiabatic compression, and hence knocking is minimized. The third torch opening 13 which projects a flame in the opposite direction improves the ignition and therefore the combustion of mixture in the portions of the main combustion chamber 8 most remote from the valves 6 and 7.

Tests have shown that the torch openings 12a and 12b should be located within one-fourth of the bore diameter of the cylinder 3 from the axis X—X. Furthermore, it has been determined that, with the axis of the cylindrical member 12 as an apex, the angle between any two of the three torch openings should be between 90° and 180°.

It has been confirmed that this invention is particularly effective for application to engines wherein the total cross sectional area of all of the torch openings is from 0.04 to 0.20 square centimeter for each cubic centimeter of the volume of the auxiliary combustion chamber. Also, the volume of the auxiliary combustion chamber should be from 0.05 to 0.12 of the total volume of both chambers when the piston is at top dead center position.

In operation, flame produced in the auxiliary combustion chamber 11 is projected through the torch opening 12b in the direction of the exhaust valve 7 and acts effectively to prevent self-ignition and consequent knocking that is likely to occur in that region. Flame is also projected through the torch opening 12a in the direction of the main intake valve 6 and improves the ignition and therefore the combustion of the mixture in that area. Furthermore, flame is projected through the auxiliary torch opening 13 in the opposite direction and improves the ignition and therefore the combustion of the mixture in that area.

Figure 2:
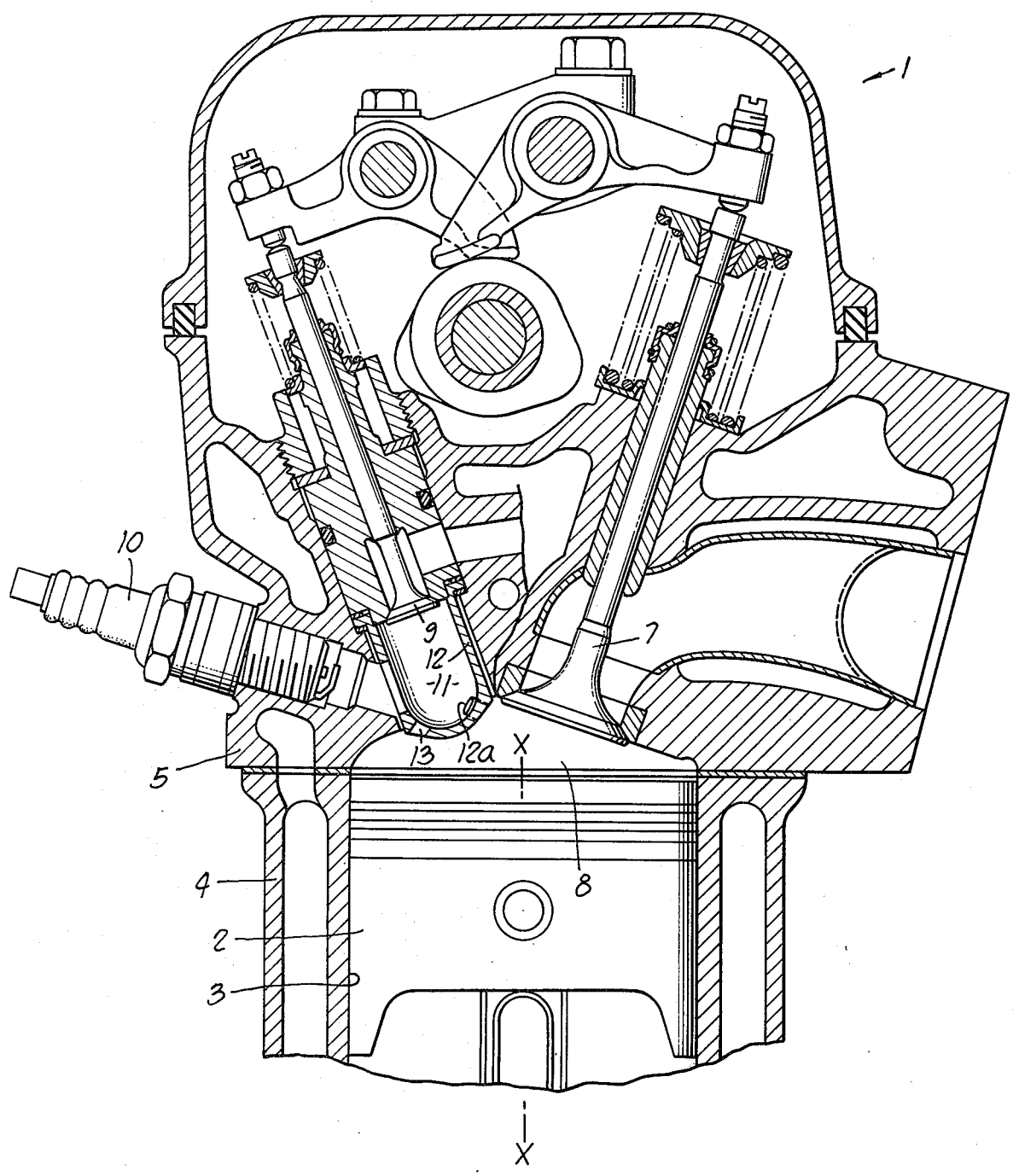
FIG. 2 is a sectional side elevation taken substantially on the lines 2—2 as shown in FIG. 1.
Figure 3:
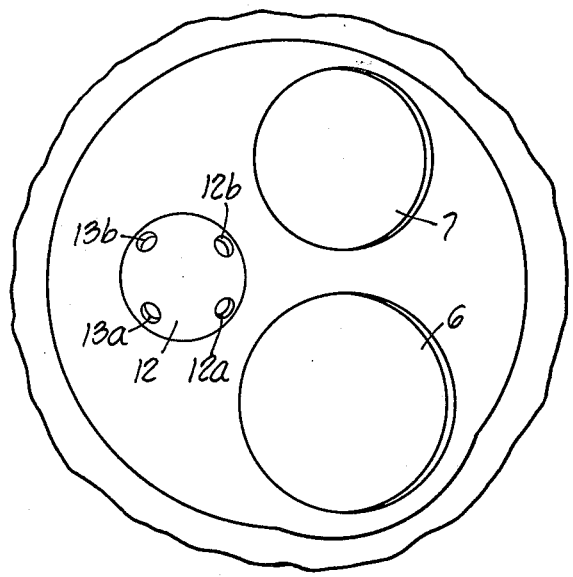
FIG. 3 is a view similar to FIG. 1 showing a modification.

The modified form of the invention shown in FIG. 3 employs the same pair of torch openings 12a and 12b, but instead of one auxiliary torch opening 13, a pair of such openings 13a and 13b are employed. The total sectional area of all of the torch openings should be from 0.04 to 0.20 square centimeter for each cubic centimeter of the volume of the auxiliary combustion chamber 11. This form of the invention is particularly well suited for engines of medium volume, whereas the form of the invention shown in FIGS. 1 and 2 is used for engines of small volume.

Figure 4:
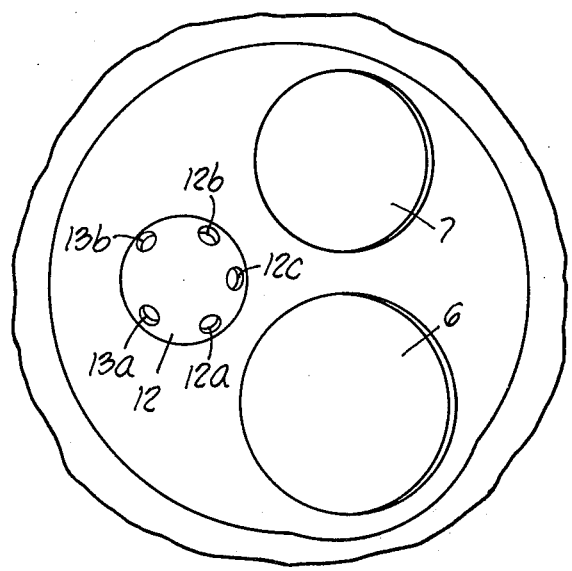
FIG. 4 is a view similar to FIG. 1 showing a second modification.

In the second modified form of the invention shown in FIG. 4, the torch openings 12a and 12b and 13a and 13b are the same as previously described, but in addition fifth torch opening 12c is placed between the torch openings 12a and 12b and oriented so that its flame is directed between the valves 6 and 7 toward the remote portion of the wall of the cylinder 3. The total sectional area of all of the torch openings should be between 0.04 and 0.20 square centimeter for each cubic centimeter of the volume of the auxiliary combustion chamber 11. This form of the invention is particularly adapted for engines with relatively large volumes.

As set forth above, an increase in engine volume, that is, an increase in the volume of each main combustion chamber 8, may be accompanied by an increase in the number of torch openings; however, the total number of such torch openings must be limited. Although it may seem desirable to provide a large number of torch openings in order to accomplish uniform combustion of the mixture throughout the main combustion chamber 8, the result in that case is that the flame is dispersed in various directions and its traveling distance is reduced in each direction. It has been found that larger numbers of torch openings are clearly not desirable in the case of extremely lean mixture which has a slow rate of flame propagation. In other words, only a few torch openings should be employed and they should be oriented to project their flames in the right directions. It is no solution to make the auxiliary combustion chamber 11 larger in volume so as to produce longer flame jets, because such is not desirable from the viewpoint of fuel consumption.

As is seen from the foregoing, in accordance with this invention at least two torch openings are employed, one being directed toward the main intake valve and the other toward the exhaust valve, and on the opposite side of the auxiliary chamber at least one auxiliary torch opening is provided. This construction is effective to insure burning of the lean mixture throughout the main combustion chamber to prevent self-ignition and knocking.

Having fully described our invention, it is to be understood that we are not to be limited to the details herein set forth but that our invention is of the full scope of the appended claims.

We claim:

1. In an internal combustion engine, the combination of: walls including a movable piston forming a main combustion chamber, said main combustion chamber having a wedge shaped apex near the extended axis of said piston, a main intake valve and a exhaust valve each having a head portion projecting into said main combustion chamber, walls forming an auxiliary combustion chamber, said auxiliary combustion chamber being positioned within said engine adjacent said main combustion chamber apex and the bottom wall of said auxiliary combustion chamber projecting into said main combustion chamber, a plurality of torch openings establishing communication between said chambers, means for igniting a mixture in said auxiliary combustion chamber to cause flames to project through said torch openings to ignite a mixture in said main combustion chamber, a first of said torch openings being positioned to direct a flame toward and across the face of said main intake valve, a second of said torch openings being positioned to direct a flame toward and across the face of said exhaust valve, and at least one additional torch opening positioned opposite said first and second torch openings to direct a flame toward a region of said main combustion chamber remote from said valves, the axis of both said first and second torch openings being approximately parallel to the upper wall of said main combustion chamber and directed toward the top most portion of the main combustion chamber side wall to produce maximum torch flame lengths and promote effective combustion.

2. In an internal combustion engine, the combination of: walls including a movable piston forming a main combustion chamber, said main combustion chamber having a wedge shaped apex near the axis of extended of said piston, a main intake valve and an exhaust valve each having a head portion projecting into said main combustion chamber, walls forming an auxiliary combustion chamber, said auxiliary combustion chamber being positioned within said engine adjacent said main combustion chamber apex and the bottom wall of said auxiliary combustion chamber projecting into said main combustion chamber, a plurality of torch openings establishing communication between said chambers, means for igniting a mixture in said auxiliary combustion chamber, a first of said torch openings being positioned to direct a flame toward and across the face of said main intake valve, a second of said torch openings being positioned to direct a flame toward and across the face of said exhaust valve, and at least one additional torch opening positioned opposite said first and second torch openings to direct a flame toward a region of said main combustion chamber remote from said valves, the total cross sectional areas of said torch openings being from 0.04 to 0.20 square centimeter for each cubic centimeter of volume of said auxiliary combustion chamber, the axis of both said first and second torch openings being approximately parallel to the upper wall of said main combustion chamber and directed toward the top most portion of the main combustion chamber side wall to produce maximum torch flame lengths and promote effective combustion.

3. In an internal combustion engine, the combustion of: walls including a movable piston forming a main combustion chamber, said main combustion chamber having a wedge shaped apex near the extended axis of said piston, a main intake valve and an exhaust valve each having a head portion projecting into said main combustion chamber, walls forming an auxiliary combustion chamber, said auxiliary combustion chamber being positioned within said engine adjacent said main combustion chamber apex and the bottom wall of said auxiliary combustion chamber, means for delivery a lean mixture to said main combustion chamber through said main intake valve, means including an auxiliary intake valve for delivery a rich mixture to said auxiliary combustion chamber, a plurality of torch openings establishing communication between said chambers, means for igniting the mixture in said auxiliary combustion chamber to cause flames to project through said torch openings to ignite the lean mixture in said main combustion chamber, a first of said torch openings being positioned to direct a flame toward and across the face of said main intake valve, a second of said torch openings being positioned to direct a flame toward and across the face of said exhaust valve, and at least one additional torch opening positioned opposite said first and second torch openings to direct a flame toward a region of said main combustion chamber remote from the latter said valves, the axis of both said first and second torch openings being approximately parallel to the upper wall of said main combustion chamber and directed toward the top most portion of the main combustion chamber side wall to produce maximum torch flame lengths and promote effective combustion.

4. In an internal combustion engine, the combination of: walls including a movable piston forming a main combustion chamber, said main combustion chamber having a wedge shaped apex near the extended axis of said piston, a main intake valve and an exhaust valve each having a head portion projecting into said main combustion chamber, walls forming an auxiliary combustion chamber, and being further defined as being positioned adjacent said main combustion chamber apex, at least three torch openings in said bottom wall establishing communication between said chambers, means for igniting a mixture in said auxiliary combustion chamber to cause flames to project through said torch openings to ignite a mixture in said main combustion chamber, the first torch opening being positioned to direct a flame toward and across the face of said main intake valve, the second torch opening being positioned to direct a flame toward and across the face of said exhaust valve, and the third torch opening being positioned opposite said first and second torch openings to direct a flame toward a region of said main combustion chamber remote from said valves, the axis of both said first and second torch openings being approximately parallel to the upper wall of said main combustion chamber and directed toward the top most portion of the main combustion chamber side wall to produce maximum torch flame lengths and promote effective combustion.

5. The combination set forth in claim 4 in which the angular spacing of said torch openings about the axis of the cylindrical auxiliary combustion chamber is between 90° and 180°.

6. The combination set forth in claim 4 in which a fourth torch opening is provided in the bottom wall of said auxiliary combustion chamber, the third and fourth torch openings being substantially symmetrically positioned with respect to the axis of the cylindrical auxiliary combustion chamber.

7. The combination set forth in claim 6 in which a fifth torch opening is provided in the bottom wall of said auxiliary combustion chamber and positioned to direct a flame between said main intake valve and said exhaust valve.

8. The combination set forth in claim 4 in which said first and second torch openings are located within one-fourth of the bore diameter of a cylinder in which the piston is mounted.

* * * * *

UNITED STATES PATENT AND TRADEMARK OFFICE
CERTIFICATE OF CORRECTION

PATENT NO. : 4,144,848
DATED : March 20, 1979
INVENTOR(S) : Toru Hatanaka et al

It is certified that error appears in the above-identified patent and that said Letters Patent are hereby corrected as shown below:

Claim 1, line 8, "a exhaust" should read --an exhaust--.

Claim 2, line 36, "axis of extended" should read --extended axis--.

Claim 3, lines 6 and 9 (second column), after "delivery" (both places) insert --of--.

Signed and Sealed this

Third Day of July 1979

[SEAL]

Attest:

Attesting Officer

LUTRELLE F. PARKER
*Acting Commissioner of Patents and Trademarks*